May 6, 1924.

W. H. TAYLOR

METHOD OF PRODUCING PARABOLIC BENDING MOLDS

Filed June 5, 1922

1,492,945

INVENTOR
Wm H. Taylor
James C. Bradley
atty

Patented May 6, 1924.

1,492,945

UNITED STATES PATENT OFFICE.

WILLIAM H. TAYLOR, OF FORD CITY, PENNSYLVANIA, ASSIGNOR TO PITTSBURGH PLATE GLASS COMPANY, A CORPORATION OF PENNSYLVANIA.

METHOD OF PRODUCING PARABOLIC BINDING MOLDS.

Application filed June 5, 1922. Serial No. 566,201.

*To all whom it may concern:*

Be it known that I, WILLIAM H. TAYLOR, a citizen of the United States, and a resident of Ford City, in the county of Armstrong and State of Pennsylvania, have made a new and useful Invention in Improvements in Methods of Producing Parabolic Bending Molds, of which the following is a specification.

Figure 1:
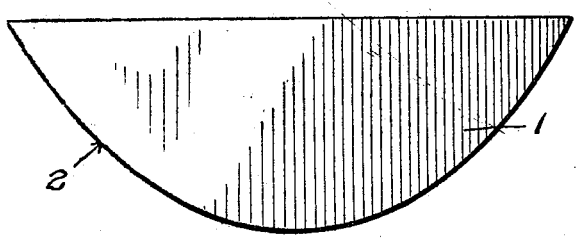
Figure 2:
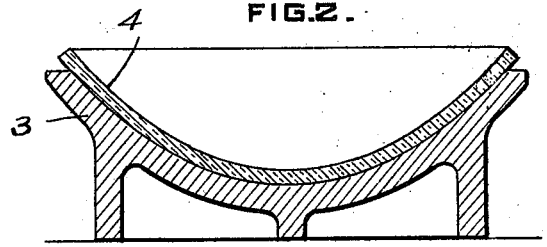

The invention relates to a method for producing a glass bending mold for use in the making of parabolic mirrors. It has for its object the provision of a procedure whereby a very high degree of accuracy in the curvature of the mold is secured, so that the glass blanks produced in the mold are correspondingly accurate. Blanks thus produced must ordinarily still be ground and polished to remove the marring effect upon the glass incident to contact with the metal surface of the mold, but with blanks thus produced, this is a relatively simple operation, as the blank itself may be used as a guide in this surfacing operation, all that it necessary being the removal of a very thin layer of glass uniformly over the area of the blank. The steps of the process are illustrated in the accompanying drawings wherein:

Figure 1 is a plan view of the sheet steel templet which is laid off by geometrical means as the first step in the procedure; Fig. 2 is a sectional view showing the mold which is produced with the sheet of glass bent therein; and Figs. 3 and 4 show in side elevation and section respectively the device employed in one step of the operation in bending a thin strip of glass to the exact curvature desired in the finished mold.

The first step in the process is the laying out of the templet 1, shown in Fig. 1. This is preferably made of a flat sheet of steel about $\frac{1}{8}$" thick and the parabolic curvature is secured by geometrical methods. The curve 2 is cut as accurately as possible. This plate is then used as a jig or templet in a boring mill for roughing out the blank 3, shown in Fig. 2. This blank is a relatively heavy casting of iron suitably stiffened by ribs so as to be subject to a minimum amount of deformation under stress and under the application of heat. After the concave surface is roughed out on the boring mill to correspond to the curvature 2, a sheet of plate glass is laid across the top of the mold and it is placed in a furnace and heated until the plate 4 sinks down to fit the surface of the mold, as indicated in Fig. 2, thus giving a parabolic blank of approximately the desired curvature.

Figure 3:
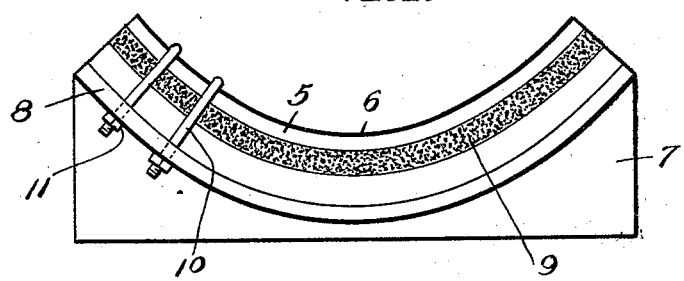

The next step in the operation is the cutting out of this blank a strip of glass 5, shown in Fig. 3, which strip is taken from the center of the blank 4 and is about 2 inches wide. The inner face of this strip is then preferably provided with a reflecting coating 6 of silver or other suitable material. This strip may also be secured by laying a flat strip of glass about 2 inches wide across the mold and heating as above set forth to secure to bending. The invention contemplates the use of either method to secure the bent strip.

Figure 4:
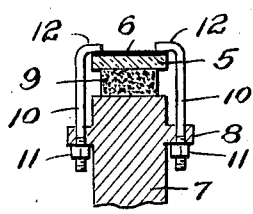

The next step of the operation is the bending of this strip cold to the exact desired contour and to accomplish this result, the clamping device, shown in Figs. 3 and 4, is employed. This device comprises a base portion 7 of wood or metal, provided with the lateral flanges 8 upon its sides and with a strip of spongy rubber 9 or other yielding support upon its upper side. Extending through the flanges 8—8 are a series of clamps 10 provided at their lower ends with the nuts 11 and having their upper ends turned inward, as indicated at 12. The glass strip is placed upon the rubber 9 and the clamps adjusted so that their hook portions engage the edges of the strip. The device is then placed under a suitable optical testing device, as used on finished parabolic mirrors for testing the accuracy of their curvature by means of reflected light, and the curvature of the strip 5 is tested. By adjusting the clamps 10, the contour of the strip may be changed and the process of adjustment is continued with the clamps until the reflected light from the strip shows that the curvature of the silvered surface of the strip accurately follows that required in the finshed reflector.

The steel templet 1 is now placed against the strip and the curve 2 is very carefully adjusted to fit the curvature of the glass strip, this adjustment being accomplished by filing the edge of the templet. In this way, a steel templet of great accuracy is secured.

The next step of the operation is the machining of the metal blank 3 in the boring mill to give its concave surface the contour of the metal templet, such templet being utilized at this time to guide the finishing cuts of the machine. The concave surface of the mold is now relatively smooth and accurate, but still shows tool marks and slight zones or irregularities which even the most careful machining fails to remove, and in order to further perfect the surface, the mold is placed upon a glass grinding machine, such as that in my copending application Serial No. 566,200, employing flexible laps carrying metal grinding blocks, and the surface is smoothed by the use of water and abrasive, such as sand or emery. Only a very thing layer of metal is removed, and during the operation the curvature is compared at intervals with the templet, and in this way the surface is maintained at a curvature corresponding to that of the templet.

If the mold is made with sufficient accuracy and highly polished, and a sheet of glass bent in it having perfectly plane parallel surfaces, such sheet will provide a convex surface of such perfection that no grinding of the surface after bending will be required and even the polishing may in some cases be dispensed with.

It will be understood that the term parabolic as used herein is not limited to curvatures which are exactly or mathematically parabolic, as the invention is equally applicable where the curvature is only partially or approximately parabolic. The ellipsoidal mirror for instance involves only a slight mathematical departure from the parabolic mirror. Similarly, as to mirrors which are parabolic along one diameter and elliptical along a diameter at right angles to the first diameter. The invention is equally applicable to these and other similar departures.

What I claim is:

1. The process of producing a bending mold for parabolic reflector blanks which consists in yieldingly supporting a strip of glass having approximately the contour of the reflector to be produced, applying pressure thereto to bend it to the desired parabolic curvature, and at the same time testing the curvature and adjusting it by light reflected from the strip, fitting a templet to the adjusted curvature of the strip, and then utilizing such templet in machining a metal blank to give a mold with a curvature corresponding to that of the templet.

2. The process of producing a bending mold for parabolic reflector blanks which consists in producing by a heating and bending operation a strip of glass having approximately the contour of the reflector to be produced, yieldingly supporting the strip, applying pressure thereto to bend it to the desired parabolic curvature, and at the same time testing the curvature and adjusting it by light reflected from the strip, fitting a templet to the adjusted curvature of the strip, and then utilizing such templet in machining a metal blank to give a mold with a curvature corresponding to that of the templet.

3. The process of producing a bending mold for parabolic reflector blanks which consists in yieldingly supporting a strip of glass having approximately the contour of the reflector to be produced, applying pressure thereto at a plurality of points along its side edges to bend it to the desired parabolic curvature, and at the same time testing the curvature and adjusting it by light reflected from the strip, fitting a templet to the adjusted curvature of the strip, and then utilizing such templet in machining a metal blank to give a mold with a curvature corresponding to that of the templet.

4. The process of producing a bending mold for parabolic reflector blanks which consists in yieldingly supporting a strip of glass having approximately the contour of the reflector to be produced, applying pressure thereto to bend it to the desired parabolic curvature, and at the same time testing the curvature and adjusting it by light reflected from the strip, fitting a templet to the adjusted curvature of the strip, utilizing such templet in machining a metal blank to give a mold with a curvature corresponding to that of the templet, and finally grinding or lapping the mold to smooth and true the machined surface and during such grinding or lapping utilizing the templet as a gauge or guide for maintaining the desired curvature of the mold.

5. The process of producing a parabolic bending mold which consists in producing a templet having the desired curvature, utilizing the templet in machining a mold with a concave parabolic face to correspond to the curvature of the mold, and finally grinding or lapping the mold to smooth and true the machined surface, and during such grinding or lapping utilizing the templet as a gauge or guide for maintaining the desired curvature of the mold.

6. The process of producing a bending mold for parabolic reflector blanks, which consists in heating and bending a plate of glass to approximately the contour of the reflector to be produced, cutting a strip from the center of the bent plate, applying a reflecting coating to the strip, supporting the strip and applying pressure thereto to bend it to the desired parabolic curvature and at the same time testing the curvature and adjusting it by light reflected from said coating, fitting a templet to the adjusted curvature of the strip, and then utilizing said templet in machining a metal blank to give a mold with a curvature corresponding to that of the templet.

7. The process of producing a bending mold for parabolic reflector blanks, which consists in laying out a templet corresponding approximately to the contour of the mold to be produced, utilizing such templet in machining the bending surface of a metal blank which is to constitute the mold, utilizing the mold to produce a strip of glass bent to fit the curvature of the mold, supporting the strip and applying pressure thereto to bend it to the desired parabolic curvature and at the same time testing the curvature and adjusting it by light reflected from the strip, cutting said templet to fit the curvature of the strip, and then utilizing said templet in surfacing the metal blank to make it correspond to the curvature of the templet.

In testimony whereof, I have hereunto subscribed my name this 1st day of June, 1922.

WM. H. TAYLOR.

Witnesses:
 FRITZ SCHEEREN,
 TILLMAN SCHEEREN.